United States Patent

Swillinger

[15] 3,637,363
[45] Jan. 25, 1972

[54] ATMOSPHERE TWEEL SEAL METHOD AND APPARATUS

[72] Inventor: Francis L. Swillinger, Perrysburg, Ohio
[73] Assignee: Libbey-Owens-Ford Company, Toledo, Ohio
[22] Filed: May 5, 1969
[21] Appl. No.: 821,607

[52] U.S. Cl. .................................65/32, 65/99 A, 65/182 R
[51] Int. Cl. .......................................................C03b 18/02
[58] Field of Search ..........................65/182 R, 99 A, 27, 32

[56] References Cited

UNITED STATES PATENTS 3,442,636   5/1969   Hideo Kita et al. ....................65/99 A Primary Examiner—Arthur D. Kellogg
Attorney—Collins and Oberlin

[57] ABSTRACT

Sealing the tweel relative to the opening through which it passes in the canal cover of an apparatus for producing float glass. A double-sectioned chamber surrounds the tweel whereby the outer section of the chamber serves as a liquid cooled support, and a gas is supplied to the inner section under pressure. The inner section has a porous wall facing the tweel through which the gas is forced to form a gaseous cushion or film preventing frictional contact between the porous wall and the tweel and minimizing the intrusion of atmospheric oxygen into the canal through the seal.

8 Claims, 6 Drawing Figures

PATENTED JAN 25 1972

INVENTOR.
Francis L. Swillinger
BY
Collins & Oberlin
ATTORNEYS

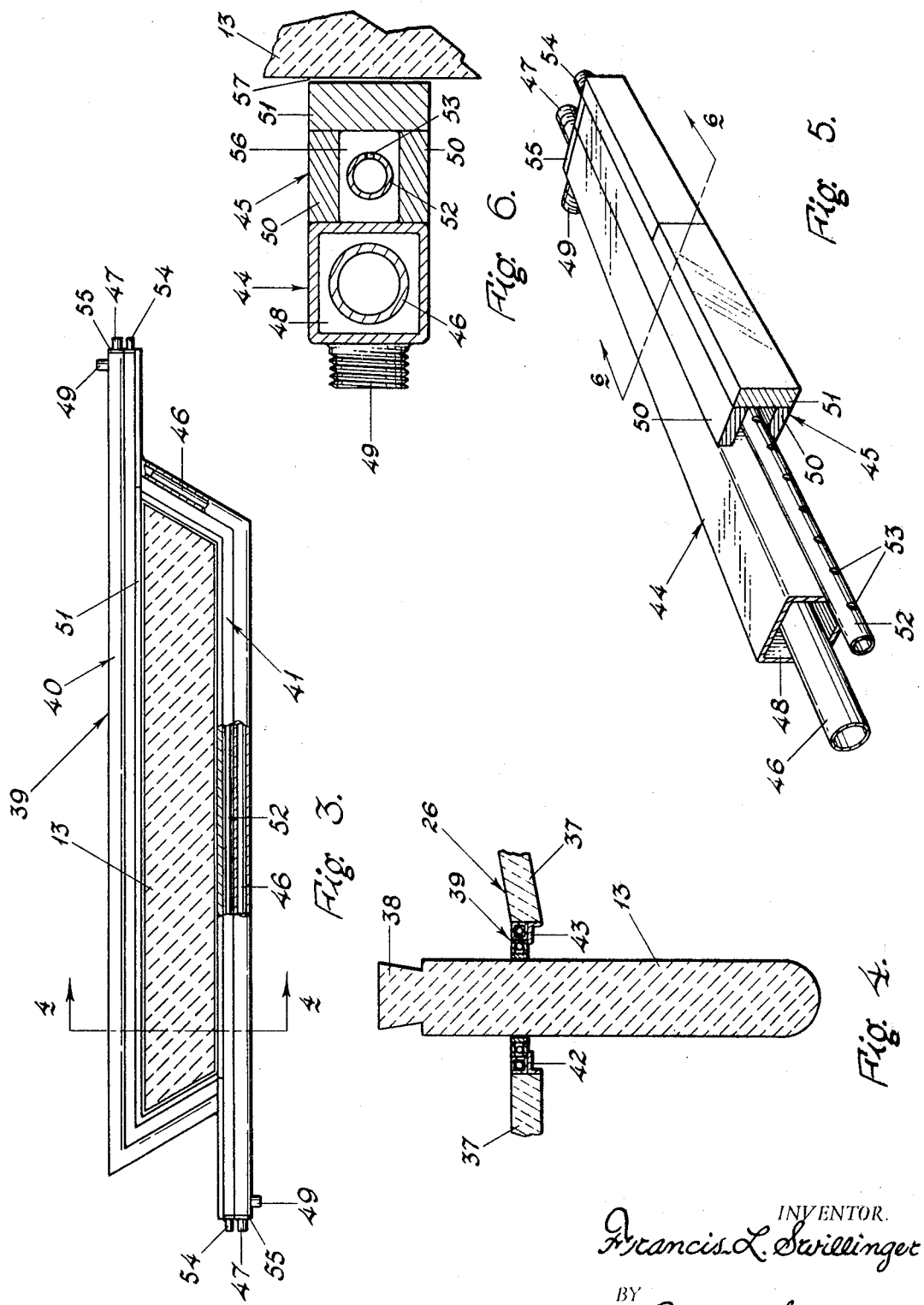

ATMOSPHERE TWEEL SEAL METHOD AND APPARATUS

BACKGROUND OF THE INVENTION

1. Field of the Invention

The present invention relates broadly to the manufacture of float glass, and more particularly to an improved seal surrounding the tweel gate in the canal cover of a float glass producing apparatus in a manner to prevent abrasion due to physical contact between the cover and the tweel gate and minimize intrusion of atmospheric oxygen into the canal or escape of float bath atmosphere at the point of sealing.

2. Description of the Prior Art

A conventional form of float glass forming apparatus is illustrated and described in U.S. Pat. No. 3,083,551, granted Apr. 2, 1963. As therein explained, the manufacture of flat glass by the float process involves delivering glass at a controlled rate onto a bath of molten metal, such as tin, and advancing it along the surface of the bath under physical and thermal conditions which assure (1) that a floating body of molten glass which is free to flow laterally is established on the molten metal, (2) that from this molten glass body there will develop on the surface of the metal bath a buoyant layer of molten glass of stable thickness, and (3) that the buoyant body will be continuously advanced in ribbon form along the surface of the molten metal bath and sufficiently cooled as it advances to permit it to be removed unharmed from the bath by mechanical conveying means.

As illustrated in FIGS. 6 and 7 and described in column 7, lines 15 to 22 of the patent, glass in molten form flows from the melting furnace through a canal, with such flow controlled by a regulating or control tweel and a tweel gate or blocking tweel as is common practice in the float glass art. It has heretofore been customary to construct both the tweels and the contact area where the tweels pass through the canal cover of refractory material.

With the prior art structures, realizing the necessity of frequently raising or lowering the control tweel to maintain flow control in feeding the molten glass onto the bath, the tweel was necessarily free to move at the point where it passed through the canal cover. When the tolerance between the tweel and the canal cover was too close, the tweel physically contacted the cover during movement and objectionable abrasion occurred, with the abraded material falling into the canal and contaminating the molten glass. On the other hand, if the apparatus were constructed so that a wider gap existed between the tweel and the cover, whereby the abrasion was minimized, objectionable infiltration of oxygen into the protective atmosphere of the bath chamber occurred. This oxygen combined with the hydrogen of the protective atmosphere to produce an extremely hot flame which caused a condition in the glass known as "reboil," in which undesirable bubbles are formed in the glass. Regardless of the exact prior art construction, these objectionable conditions were not overcome simultaneously.

SUMMARY

According to the present invention, the problem of the seal between the tweel and the roof of the canal is overcome, abrasion between adjacent refractory surfaces is eliminated, and the leakage of oxygen into the canal is minimized, by the provision of an improved gaseous seal located in the roof of the canal through which the tweel passes. The seal surrounds the tweel with a cushioning film of gas escaping through a porous surface, preventing frictional contact and providing a buffer of escaping gas to prevent the infiltration of outside oxygen.

It is, therefore, a primary object of the invention to provide an improved means of sealing the tweel in the opening of the canal cover in a manner that will avoid objectionable physical contact during movement of the tweel.

Another object is to provide such a sealing means which will permit the tweel to be freely raised and lowered while maintaining atmosphere integrity within the canal by preventing infiltration of atmospheric oxygen through the seal.

Another object is to provide a sealing means which is self-supporting and compact and can be readily installed in the roof of the canal.

Other objects and advantages of the invention will become apparent during the course of the following description when taken in connection with the accompanying drawings.

BRIEF DESCRIPTION OF THE DRAWINGS

In the drawings, wherein like numerals refer to like parts throughout:

FIG. 3 is an enlarged plan view of the tweel and surrounding seal with portions cut away;

FIG. 4 is a transverse vertical section taken substantially along line 4—4 of FIG. 3;

FIG. 5 is an enlarged perspective view of the seal with parts broken away; and

FIG. 6 is an enlarged transverse view of the seal taken substantially along line 6—6 of FIG. 5 and showing the relationship of the porous wall to the adjacent tweel.

DESCRIPTION OF THE INVENTION

Figure 1:
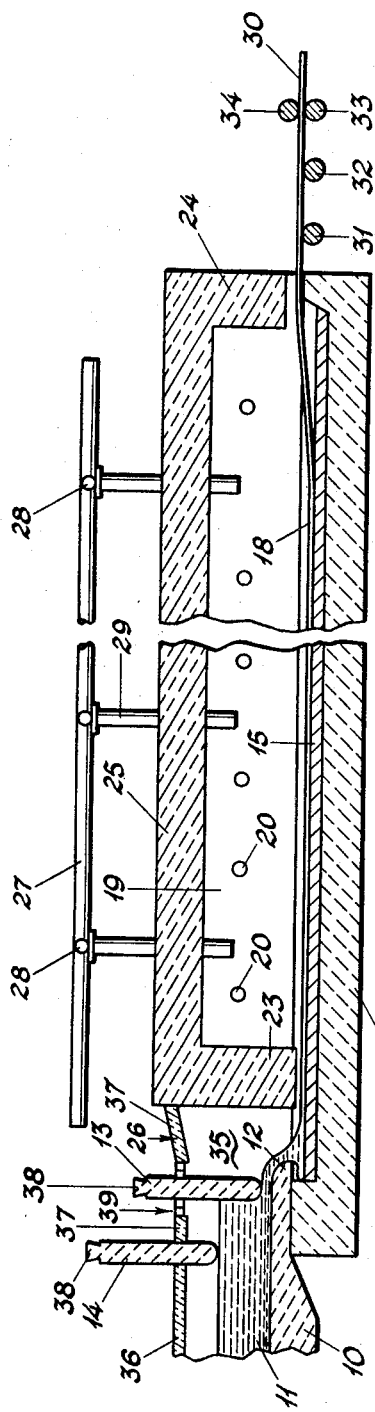
FIG. 1 is a longitudinal, vertical sectional view through a representative form of float glass apparatus embodying the invention.
Figure 2:
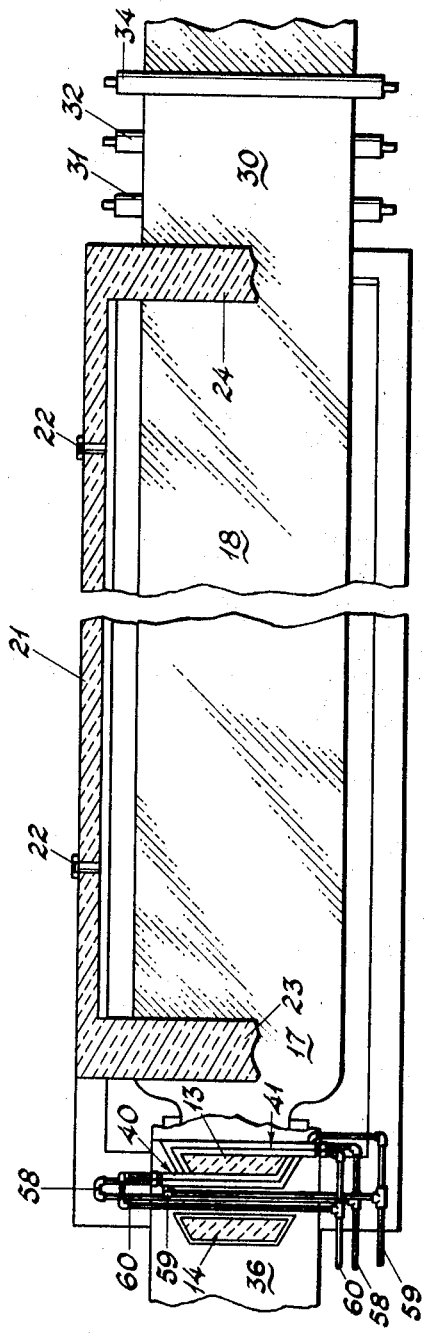
FIG. 2 is a plan view of the apparatus of FIG. 1 with the superstructure partially removed.

Referring to the drawings, there is illustrated generally in FIGS. 1 and 2 a typical float glass machine similar to the one disclosed in the aforementioned U.S. Pat. No. 3,083,551. Shown at 10 is the forehearth of a continuous glass melting furnace, from which a supply of molten glass 11 is delivered through and over a spout assembly 12 in an amount regulated by a control tweel 13. A so-called blocking tweel 14 is positioned upstream from the control tweel 13 so that it can be lowered to shut off the flow of molten glass along the forehearth or canal 10 to the control tweel should it be desired to do so.

The glass flows from the spout 12 onto a relatively wide metal bath 15 contained in a tank 16, and forms a buoyant body of molten glass, indicated at 17, from which a buoyant layer 18 of stable thickness develops in ribbon form.

The metal bath 15 in the tank 16 and the headspace 19 over the bath are heated by radiant heat directed downwardly from heaters 20. The headspace is enclosed by sidewalls 21 containing windows 22, and end wall 23 at the inlet end of the tank, an end wall 24 at the outlet end of the tank, and a roof structure 25. The enclosed headspace volume 19, usually referred to as a plenum chamber, along with an extension 26 over the spout area, contains enough space to maintain a sufficient amount of protective gas, known as the float or bath atmosphere, over that part of the metal bath 15 that is exposed at each side of the buoyant body 17 and layer 18 of glass. The protective gas is one which will not react chemically with the metal bath 15 to produce contaminants of the glass or the bath itself. For example, the gas may be a mixture of nitrogen and hydrogen. By maintaining slightly positive pressure within the headspace 19, entrance of atmospheric air is theoretically prevented and the integrity of the protective gas is maintained. However, as a practical matter, it has been found that this is not always true at all points in the system. The float atmosphere is supplied in sufficient quantity to the headspace 19 through a duct system which includes a main header 27 with branches 28 and chamber inlet ducts 29.

The temperature within the tank 16 is controlled by the radiant heaters 20 such that the buoyant layer or ribbon 18 is progressively cooled as it moves over the molten metal bath to the discharge end thereof, by which time the ultimate ribbon 30 reaches a condition of stiffness adequate to allow it to be transferred to an adjacent annealing lehr by mechanical conveying means without detriment to its lower surface.

One type of mechanical conveying means that may suitably be employed for this purpose includes supporting rollers 31, 32 and 33 and superimposed roller 34 mounted outside of the discharge throat of the tank. Any or all of the rollers may be driven by known means and cooperate to apply a tractive effort to the ribbon of glass moving towards the outlet end sufficient to advance it along the bath. An ultimate ribbon 30 of a thickness less than the equilibrium thickness of the buoyant layer 18 may be obtained by increasing the speed of the rollers 31 to 34 and thereby increasing their tractional effort and attenuating the molten glass body 18 of stable thickness.

The molten glass 11 flows along the forehearth or canal 10 between opposite sidewalls 35. A roof 36 over the canal and an associated roof 37 over the extension 26 of the spout area enclose the canal and spout area to prevent adverse cooling effects of air currents upon, and entry of foreign matter into, the molten glass flowing through the canal into the bath. The control tweel 13 and blocking tweel 14 extend through the canal roof 36 and/or roof extension 37, and are supported from above as by conventional devices (not shown) which engage dovetailed sections 38 extending along their top edge.

It will be appreciated that the amount of glass delivered over the spout lip 12 onto the bath 15 is regulated by the control tweel 13. It is consequently necessary that the tweel 13 be freely vertically adjustable, and thus it must be free to move at the point where it passes through the roof 36 and/or roof extension 37. Contamination of the molten glass in the canal at this point by abraded particles resulting from physical contact between the refractory tweel and canal roof is highly undesirable, as is the aforementioned reboil condition due to infiltration of air from outside the canal chamber.

As previously explained, reduction of one of the undesirable effects heretofore has tended to cause an increase in the other, i.e., decreasing the tolerance or space between the tweel and roof to reduce the amount of air infiltration resulted in greater abrasive contact between the adjacent surfaces, while increasing the tolerance reduced abrasive contact but increased the amount of air infiltration.

In accordance with the present invention these problems are overcome by provision of a novel seal employing a gaseous cushion or film compatible with the bath atmosphere adjacent the surface of the tweel. The film prevents frictional contact between the moving surfaces even though the space therebetween may be very small, and also provides a buffer of gas compatible with the atmosphere of the bath which prevents infiltration of outside air.

The sealing device, shown generally at 39, surrounds the tweel and, for ease of fabrication and installation, may be made in two generally L-shaped complementary sections 40 and 41 (FIG. 3). The L-shaped sections may be supported by resting upon ledges 42 and 43 at the edge of the members forming the roof 36 or 37, respectively, or by other conventional support means. Of course, it is contemplated that the device 39 might also be fabricated as a single unit encircling the tweel.

Each of the sections 40 and 41 is comprised of a tubular cooling and support member 44 to which is secured a pressure duct 45. A conduit 46 extends axially within the tubular member 44. At one of its ends the conduit 46 is connected through a coupling 47 to a source of heat absorbing medium, and at its other end, adjacent the closed end of the tubular member 44, it discharges the fluid into the chamber 48 between the tubular member and conduit. A second coupling 49 is provided at the end of the tubular member 44 for connecting the chamber 48 to a suitable effluent line. Thus, the heat absorbing medium enters the conduit 46 through the coupling 47, flows to the opposite end where it is discharged into the chamber 48 and flows back to the entry point for discharge through the coupling 49 in a counterflow manner.

The pressure duct 45 is formed by spaced walls 50 extending from the tubular member 44, and a porous wall 51 which faces the adjacent surface of the tweel 13. A manifold pipe 52 having spaced perforations 53 therein is located within the duct 45 and connected, through a nipple 54 at one end, to a source of suitable gas under pressure. The ends of the pressure duct 45, as well as the tubular member 44, are closed as by plates 55. There is thus formed a plenum chamber 56 within the pressure duct 45. As gas is supplied to the manifold pipe 52 under pressure, it emerges from the spaced perforations 53 to create a uniform pressure within the plenum chamber 56 throughout its length. The gas is forced through the porous wall 51 facing the tweel 13 to form a thin film 57 of gas therebetween (FIG. 6).

Suitable piping, shown generally at 58, may be arranged in any preferred manner to connect the couplings 47 of the sections 40 and 41 to a source of heat absorbing medium, generally water, and similar piping 59 is arranged to connect the couplings 49 to a disposal means for the spent medium. Piping 60 connects the manifold pipes 52 to a supply of gas under pressure through the nipples 54.

The wall 51 may advantageously be formed of any material which will withstand the temperatures encountered while permitting passage of the gas to form the film 57. Porous metal has been found particularly suitable for this purpose; and Feltmetal, a product commercially available from the Huyck Equipment Company, Melford, Conn., has been employed with excellent results. Sintered and perforated metallic members are examples of other materials which may be employed.

The gas supplied to the plenum chamber 56 must, of course, be compatible with the bath atmosphere since some of it may enter the enclosed area over the canal and mingle with the bath atmosphere in the headspace 19. A mixture of gases equivalent to the bath atmosphere itself may be employed. Excellent results have been obtained using pure nitrogen for this purpose. The volume of gas required is relatively small, and the pressure at which it is supplied will depend upon the porosity of the wall 51. However, it has been found that with a wall 51 of the above-mentioned Feltmetal, supplying nitrogen at a pressure in the approximate range from about 10 to 100 p.s.i., will create a film 57 providing a suitable seal around the tweel. A pressure of about 56 p.s.i. has been found to give excellent results while using only about 500 cubic feet (STP) of nitrogen per hour. Of course, part of this nitrogen finds its way into the bath atmosphere so that not all of it is wasted.

The gas film 57, in addition to preventing infiltration of external atmosphere around the tweel, prevents the wall 51 from coming into direct contact with the tweel even though the gap therebetween may be very small. Thus, the gap can be minimized, and yet the lubricating effect of the film 57 prevents abrasive removal of particles from the tweel.

The blocking tweel 14, while it is held up out of the glass and not vertically adjusted during normal operations, must be adapted to be lowered at any time on short notice to discontinue flow of molten glass to the spout and bath. For this reason, it will be readily appreciated that while for purposes of simplification the seal has been illustrated only in connection with the control tweel 13, it may also advantageously be employed with the blocking tweel 14.

It is to be understood that the form of the invention herewith shown and described is to be taken as an illustrative embodiment only of the same, and that various changes in the shape, size and arrangement of parts, as well as various procedural changes may be resorted to without departing from the spirit of the invention.

I claim

1. In a seal for a movable tweel member extending through the cover over the canal through which molten glass flows from a melting furnace to a float glass apparatus, the improvement comprising a porous member incorporated in said cover facing at least the major surfaces of and closely adjacent said tweel member at the point where it passes through said cover, and means supplying and forcing a gas through said porous member to form a gaseous film on said porous member filling the gap between said porous member and said tweel member and preventing abrasive contact with said tweel during movement thereof.

2. A seal for a movable tweel member as claimed in claim 1, including a duct in said cover substantially surrounding said tweel, said porous member comprising a wall of said duct, and means supplying said gas to said duct.

3. A seal for a vertically movable tweel member as claimed in claim 2, wherein said duct is comprised of two complementary "L"-shaped sections.

4. A seal for a movable tweel member as claimed in claim 1, including a tubular cooling and support member substantially surrounding said tweel, means for circulating a heat absorbing medium through said tubular member, a pressure duct secured to said tubular member and substantially surrounding said tweel, said porous member comprising the wall of said duct facing said tweel, and means supplying said gas to said duct under pressure whereby said gas is forced through said porous wall to form said gaseous film.

5. A seal for a movable tweel member as claimed in claim 4, wherein said tubular cooling and support member comprises an outer tubular member having ends closed by plates, an inner conduit mounted axially within said outer tubular member and extending from an inlet connection at said inlet end of said outer tubular member, means connection at one end of said outer tubular member to a point adjacent to the other end thereof, a discharge connection at said inlet end of said outer tubular member, means connected to said inlet connection for supplying a heat absorbing medium to said inner conduit, and means connected to said discharge connection for disposing of spent heat absorbing medium, whereby said heat absorbing medium enters at one end of said tubular member, flows the length of said inner conduit, is emitted into said outer tubular member, and returns to said discharge connection effecting a counterflow system.

6. A seal for a movable tweel member as claimed in claim 4, wherein said pressure duct comprises a chamber rectangular in cross section and having said porous wall, a pair of spaced walls extending from said porous wall and secured to said outer tubular member, said outer tubular member forming the fourth wall of said chamber, and a plate closing each end of said chamber.

7. A seal for a movable tweel member as claimed in claim 6, including a manifold pipe mounted within said rectangular duct and extending axially from an inlet connection at one end of said duct to a closed termination at the other end thereof, said pipe having a plurality of perforations spaced throughout its length to distribute said gas uniformly in said chamber.

8. In a method of adjusting the elevation of a tweel extending through an opening in the cover over the canal through which molten glass flows from a melting furnace to a float glass bath, the improvement comprising supplying a gas compatible with the atmosphere within said canal through the walls defining said opening and facing at least the major surfaces of said tweel under sufficient pressure to maintain a film of said gas within the gap between the tweel and cover, said gas filling said gap and flowing outwardly therefrom to prevent movement of atmosphere through said gap from either side of said cover to the other, and moving said tweel through said opening to the desired elevation with said film of gas preventing abrasive contact between said tweel and cover.

* * * * *

PO-1050
(5/69)

UNITED STATES PATENT OFFICE
CERTIFICATE OF CORRECTION

Patent No. 3,637,363              Dated  January 25, 1972

Inventor(s)    Francis L. Swillinger

It is certified that error appears in the above-identified patent and that said Letters Patent are hereby corrected as shown below:

Col. 5, lines 21 and 22, cancel "said inlet end of said outer tubular member, means connection at"

Signed and sealed this 22nd day of August 1972.

(SEAL)
Attest:

EDWARD M. FLETCHER, JR.
Attesting Officer

ROBERT GOTTSCHALK
Commissioner of Patents